(12) United States Patent
Watt

(10) Patent No.: US 9,094,785 B2
(45) Date of Patent: Jul. 28, 2015

(54) APPLICATION PROGRAMMING INTERFACE FOR MAPPING APPLICATION

(75) Inventor: Robert Anthony Watt, Ottawa (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 313 days.

(21) Appl. No.: 12/938,422

(22) Filed: Nov. 3, 2010

(65) Prior Publication Data

US 2012/0017166 A1 Jan. 19, 2012

Related U.S. Application Data

(60) Provisional application No. 61/364,849, filed on Jul. 16, 2010.

(51) Int. Cl.
| | |
|---|---|
| *G06F 3/0484* | (2013.01) |
| *G01C 21/36* | (2006.01) |
| *G06F 17/30* | (2006.01) |
| *H04W 4/02* | (2009.01) |
| *H04W 4/18* | (2009.01) |

(52) U.S. Cl.
CPC ........... *H04W 4/02* (2013.01); *G06F 17/30241* (2013.01); *G06F 17/30525* (2013.01); *H04W 4/185* (2013.01)

(58) Field of Classification Search
CPC ...................... G06Q 30/0259; G06F 17/30241; G01C 21/3679
USPC ............................................ 715/771; 345/633
See application file for complete search history.

(56) References Cited

U.S. PATENT DOCUMENTS

| | | | |
|---|---|---|---|
| 7,373,244 B2 | 5/2008 | Kreft | |
| 2003/0215110 A1* | 11/2003 | Rhoads et al. | 382/100 |
| 2007/0027591 A1* | 2/2007 | Goldenberg et al. | 701/23 |
| 2007/0203644 A1* | 8/2007 | Thota et al. | 701/211 |
| 2007/0258642 A1* | 11/2007 | Thota | 382/173 |
| 2007/0281690 A1 | 12/2007 | Altman et al. | |
| 2008/0132252 A1* | 6/2008 | Altman et al. | 455/457 |
| 2009/0327071 A1* | 12/2009 | Kreft | 705/14.49 |
| 2010/0106801 A1* | 4/2010 | Bliss et al. | 709/219 |
| 2012/0017166 A1* | 1/2012 | Watt | 715/771 |

OTHER PUBLICATIONS

Unknown Author; Layers—OpenLayers; http://docs.openlayers.org/library/layers.html; 7 pages.
"Flash: Toggle the Visibility of a Symbol?" BigResouce—Getting even bigger; http://www.bigresource.com/FLASH-Toggle-the-visibility-of-a-symbol--7EkqfMP7ny.html; 13 pages.
(Continued)

*Primary Examiner* — Jordany Nunez
(74) *Attorney, Agent, or Firm* — Rowand LLP

(57) ABSTRACT

A method of and mobile device are provided. The method comprises: receiving, at an application programming interface associated with a mapping application on a device, one or more tagging commands to associate specified geospatial data with a specified tag; in response to receiving each tagging command, updating a memory of the device to store an association between the specified geospatial data and the specified tag; receiving, at the application programming interface, a function command, wherein the function command references one of the specified tags; and in response to receiving the function command, executing a function associated with the function command for all geospatial data associated with the tag referenced by the function command.

16 Claims, 7 Drawing Sheets

(56) References Cited

OTHER PUBLICATIONS

Google Static Maps API—Google Code; "Static Maps API V2 Developer Guide"; http://code.google.com/apis/maps/documentation/staticmaps/; 28 pages.
OpenLayers.Layer—Open Layers; http://dev.openlayers.org/docs/files/OpenLayers/Layer-js.html; 10 pages.
ESRI Developer NEtwork; "Common Set Visible Layers in a Map and Toc"; http://edndoc.esri.com/arcobjects/9.2/NET_Server_Doc/developer/samples/Web_Applications/8aa4e95f-bb16-42d1-a6c3-fefc4b83e6b2.htm; 2 pages.
Adding label to marker in Google Maps—Drupal.org; http://drupal.org/node1212593; 3 pages.
"Map Kit Framework Reference"; http://developer.apple.com/library/ios/documentation/MapKit/Reference/MapKit_Framework; 2 pages.
"Location and Maps"; Android Developers; http://developerandroid.com/guide/topics/location/index.html; 2 pages.
Geospatial Training & Consulting, LLC: "Google Maps API", Apr. 30, 2006, XR002625023, Retrieved from the Internet: URL:http://www.geospatialtraining.com/Goog.
Extended European Search Report dated Mar. 11, 2011.
CIPO, CA Office Action relating to Application No. 2,746,030 dated Mar. 28, 2014.

\* cited by examiner

US 9,094,785 B2

APPLICATION PROGRAMMING INTERFACE FOR MAPPING APPLICATION

CROSS-REFERENCE TO RELATED APPLICATION

This application claims the benefit of, and priority to U.S. Provisional Application No. 61/364,849, filed Jul. 16, 2010 under the title "APPLICATION PROGRAMMING INTERFACE FOR MAPPING APPLICATION". The content of the above-noted patent application is hereby expressly incorporated by reference into the detailed description hereof.

TECHNICAL FIELD

The present disclosure relates generally to mobile device applications and, more particularly to an application programming interface for managing geospatial data for a mapping application on a device.

BACKGROUND

Mobile devices are sometimes equipped with a mapping application which allows visual representations of a geographic area to be displayed on a display screen of such devices. Such mapping applications may, among other things, display street maps and/or topographic maps and may provide navigational assistance such as a route planner for travelling by vehicle, foot and/or public transit.

Some mapping applications may allow geospatial data identifiers, such as pushpins, which identify geospatial data to be displayed on a map. Geospatial data includes data which is related to geographic and/or spatial information. By way of example, geospatial data may pertain to a location of a feature, which may be natural or constructed. Such features may include, for example, objects, businesses, or structures. By way of example, latitude and longitude coordinates are a form of geospatial data.

The functionality of other applications on a mobile device may be enhanced by permitting the other applications to access one or more functions which are provided by the mapping application.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
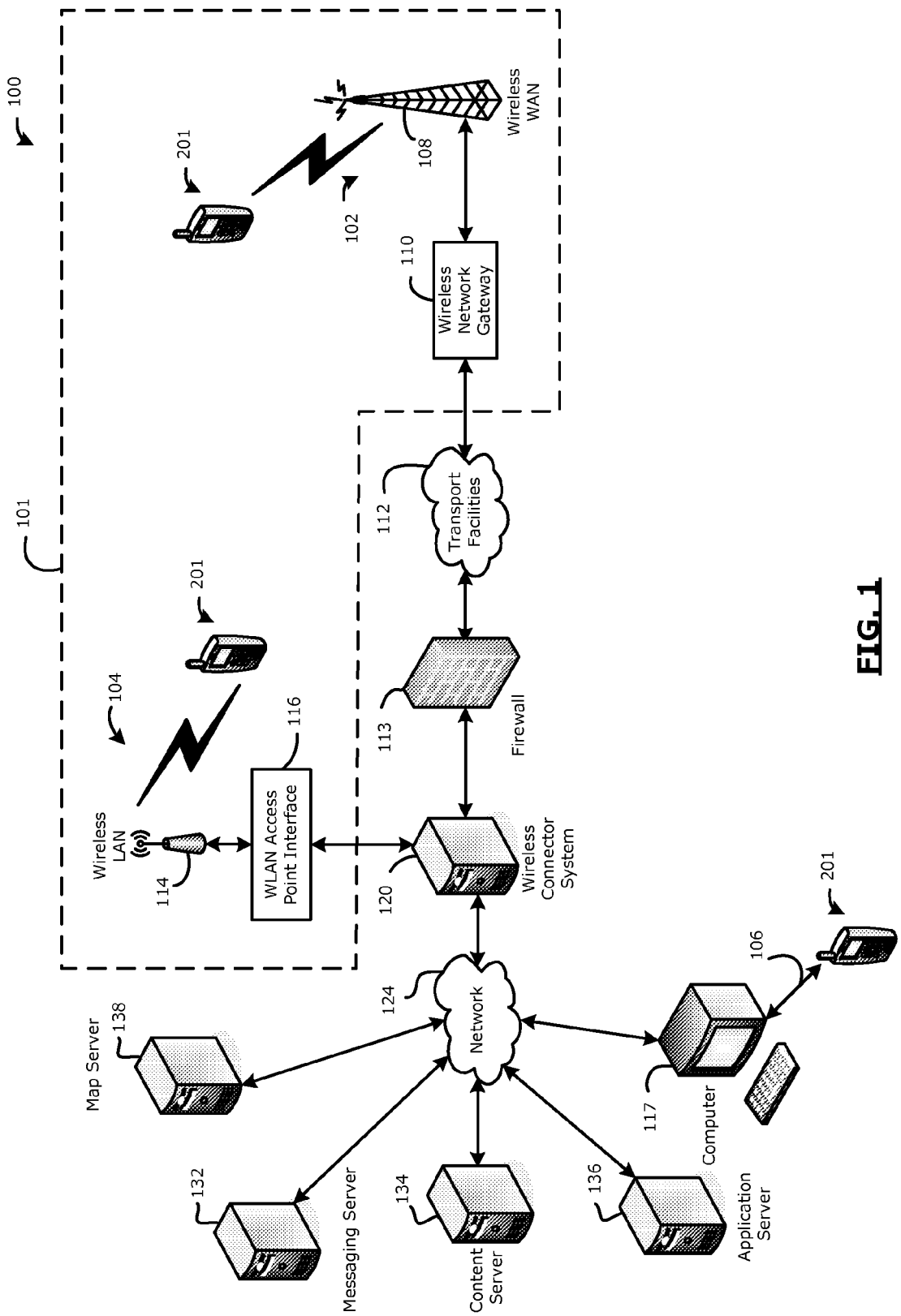
FIG. 1 is a block diagram of a communication system in which example embodiments of the present disclosure can be applied.

In one aspect, the present application provides a method comprising: receiving, at an application programming interface associated with a mapping application on a device, one or more tagging commands to associate specified geospatial data with a specified tag; in response to receiving each tagging command, updating a memory of the device to store an association between the specified geospatial data and the specified tag; receiving, at the application programming interface, a function command, wherein the function command references one of the specified tags; and in response to receiving the function command, executing a function associated with the function command for all geospatial data associated with the tag referenced by the function command.

In another aspect, the present application provides a mobile device. The mobile device includes at least one processor and at least one memory storing a mapping application having an application programming interface. The application programming interface is configured to cause the processor to: receive, at an application programming interface associated with a mapping application on a device, one or more tagging commands to associate specified geospatial data with a specified tag; in response to receiving each tagging command, update a memory of the device to store the an association between the specified geospatial data and the specified tag; receive, at the application programming interface, a function command, wherein the function command references one of the specified tags; and in response to receiving the function command, execute a function associated with the function command for all geospatial data associated with the tag referenced by the function command.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application describes, among other things, an electronic device having a mapping application which includes an application programming interface (API) which permits other applications on the device to access at least some of the features provided by the mapping application.

The device may, in some embodiments, be a mobile wireless device having mobile communication capabilities such as, for example, data communication capabilities. However, depending on the functionality of the device, in various embodiments, the device may be a mobile wireless device, a data communication device, a multiple-mode communication device configured for both data and voice communication, a smartphone, a mobile telephone or a PDA (personal digital assistant) enabled for wireless communication, or a computer system with a wireless modem. It will be appreciated that, in some embodiments, the systems and methods presented herein may be applied to an electronic device that does not, necessarily, have communication capabilities; such as, for example a PDA which is not enabled for communication. In some embodiments, the device may be a global positioning system (GPS) device.

Accordingly, the device 201 (FIG. 1) may, in various instances throughout this disclosure, be referred to as a mobile device 201, a mobile communication device 201, or an electronic device 201.

System Overview

In order to facilitate an understanding of one possible environment in which example embodiments described herein can operate, reference is first made to FIG. 1 which shows in block diagram form a communication system 100 in which example embodiments of the present disclosure can be applied. The communication system 100 includes a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA1010, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201 and a map server 138 for providing map data to the device 201.

The wireless connector system 120 typically provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, map server 138 or application servers 136. Conversely, the wireless connector system 120 sends data packets received, for example, from the messaging server 132, content server 134, map server 138 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, map server 138 and application server 136.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In one embodiments, the link 106 is a USB connection to the mobile communication device 201.

The device 201 may access a map server 138 through the network 124. The map server 138 may store map data such as, for example, map images which may include satellite images or a traditional visual representation of a geographical area.

In at least some embodiments, map data which is stored on the map server 138 may be accessed by the mobile communication device 201. A mapping application 226 (FIG. 2) running on the device 201 may display the map data on a display of the device 201. The mapping application 226 (FIG. 2) running on the device 201 may request map data as such data is required. For example, when the mapping application needs to display map data for an area which it has not previously displayed, the mapping application may request map data from the map server 138.

Figure 2:
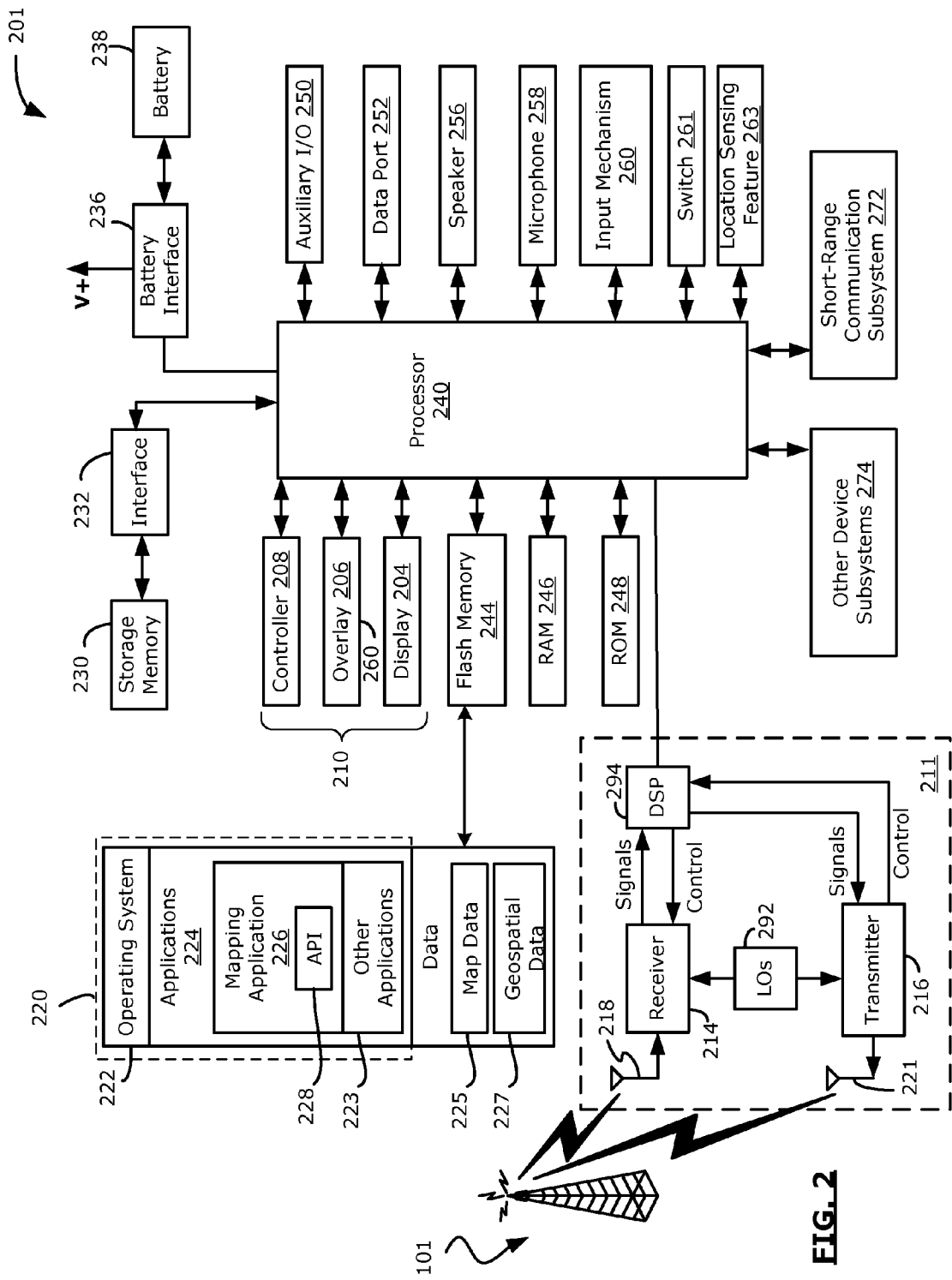
FIG. 2 is a block diagram illustrating a mobile wireless device in accordance with example embodiments of the present disclosure.

In other embodiments (as shown in FIG. 2), the map data may be stored locally on the mobile device 201 and the mapping application running on the device 201 may access the local map data and display the map data on a display of the device 201. In such embodiments, the mobile device 201 may not, necessarily, have communication capabilities.

It will also be appreciated that, in some embodiments, map data may be provided both on a map server 138 and in local memory of the device 201. The local memory of the device 201 may store a portion of the map data 138 available through the map server 138. For example, the local memory may store frequently used map data. For example, the local memory may store map data for a home city of a user of the device 201 (i.e. a city in which the device 201 is often located). When the device 201 travels outside the area defined by the locally stored map data, or when a user or application wishes to display map data for an area which is not defined by the locally stored map data, then the map data may be retrieved from the map server 138.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Reference is now made to FIG. 2 which illustrates a block diagram of a mobile device 201 in which example embodiments described in the present disclosure can be applied. In the embodiment shown, the mobile device 201 is a two-way mobile communication device having data and possibly also voice communication capabilities, and the capability to communicate with other computer systems, for example, via the Internet. Depending on the functionality provided by the mobile device 201, in various embodiments the device 201 may be a data communication device, a multiple-mode communication device configured for both data and voice communication, a smartphone, a mobile telephone or a PDA (personal digital assistant) enabled for wireless communication, or a computer system with a wireless modem. It will be appreciated that, in some embodiments, the systems and methods presented herein may be applied to an electronic device that does not, necessarily, have communication capabilities; such as, for example a PDA or GPS which is not enabled for communication.

The mobile device 201 includes at least one controller comprising at least one processor 240 such as a microprocessor which controls the overall operation of the mobile device 201, and a wireless communication subsystem 211 for exchanging radio frequency signals with a wireless network 101. The processor 240 interacts with the communication subsystem 211 which performs communication functions. The processor 240 interacts with additional device subsystems. In some embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. The touch-sensitive overlay 206 acts as an input mechanism 260, allowing the user of the device 201 to input commands to the processor 240.

In some embodiments, the device 201 may include other input mechanisms 260 instead of or in addition to the touch-screen. The other input mechanisms may include, for example, a depressible scroll wheel (which may also be referred to as a trackball), a touch-pad such as an optical touchpad, an optical jog ball, and/or a physical keyboard.

It will be appreciated that the specific input mechanisms 260 associated with the device 201 will vary from device-to-device. That is, some devices 201 may have a first input mechanism 260 or first set of input mechanisms 260, while other devices 260 may have a second input mechanism 260 or second set of input mechanisms 260.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, input mechanisms 260, switch 261, short-range communication subsystem 272, location sensing feature 263, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 292, and a processing module such as a digital signal processor (DSP) 294. The antenna elements 218 and 221 may be embedded or internal to the mobile device 201 and a single antenna may be shared by both receiver and transmitter, as is known in the art. As will be apparent to those skilled in the field of communication, the particular design of the communication subsystem 211 depends on the wireless network 101 in which the mobile device 201 is intended to operate.

The mobile device 201 may communicate with any one of a plurality of fixed transceiver base stations (not shown) of the wireless network 101 within its geographic coverage area. The mobile device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 294. In a similar manner, signals to be transmitted are processed, including modulation and encoding, for example, by the DSP 294. These DSP-processed signals are input to the transmitter 216 for digital-to-analog (D/A) conversion, frequency up conversion, filtering, amplification, and transmission to the wireless network 101 via the antenna 221. The DSP 294 not only processes communication signals, but may also provides for receiver and transmitter control. For example, the gains applied to communication signals in the receiver 214 and the transmitter 216 may be adaptively controlled through automatic gain control algorithms implemented in the DSP 294.

The processor 240 operates under stored program control and executes software modules 220 stored in memory such as persistent memory; for example, in the flash memory 244. As illustrated in FIG. 2, the software modules 220 comprise operating system software 222 and applications 224.

The applications 224 include a mapping application 226 and other applications 223. The mapping application 226 is configured to render a map on the display 204 of the device 201. The map may be an image which may, in some embodiments, be a photograph which has been captured on a camera, such as a camera operating on a satellite. That is, the map may be a satellite image. In other embodiments, the map may be a traditional visual representation of a geographic area, such as a street map or a topographic map.

The map may be defined by map data 225, which may, in some embodiments, be stored, in whole or in part, in the memory of the device 201. The map data 225 includes graphic data which may be used to render the map on the display. The map data 225 also includes coordinating data, such as latitude and longitude values which may be used to determine the location of the map relative to one or more features of the earth, such as the equator and the prime meridian.

The mapping application 226 also has the ability to display one or more overlays on the map. That is, the mapping application 226 has the ability to display a layer of data on the map. The data which may be displayed on the map may represent geospatial data 227. Geospatial data 227 is information which is related to a geographic location. For example, geospatial data may pertain to characteristics of natural or constructed features and boundaries on the earth's surface. Geospatial data includes coordinating data, such as latitude and longitude values which may be used to determine the location of the geospatial data relative to the map.

Geospatial data may, for example, include coordinating data to identify a point of interest on a map, such as a location of a person, place or thing, a route, or a geographic area. The geospatial data may be defined relative to one or more features of the earth, such as the equator and the prime meridian. Where the geospatial data identifies a point, the geospatial data may be defined by coordinates, such as latitude and longitude coordinates. Where the geospatial data identifies an area, the geospatial data may be defined by a polygon, a circle, an ellipse, or another shape. Similarly, where the geospatial data identifies a route or line, the geospatial data may, for example, be defined as a vector, or as a series of points. It will be appreciated that other methods of defining geospatial data are also possible.

The geospatial data may include other information associated with the coordinating data, such as, for example, identifying information such as a name associated with a business, place or thing defined by the coordinating data.

The mapping application 226 may include features in addition to the ability to render a map defined by map data and an overlay of geospatial data. For example, the mapping application 226 may include navigation features such as the ability to determine a route between a first location and a second location, and/or the ability to provide directions such as turn-by-turn directions.

The mapping application 226 may, in some embodiments, access a location sensing feature 263 of the device 201. The location sensing feature 263 may include a global positioning system (GPS) receiver. In some embodiments, the location sensing feature 263 may be provided by a cell-site location method which triangulates the signal strengths of different cell transmitters and uses their location (which may be determined from an online cell site database) to determine a current location of the device 201. In other embodiments, the location sensing feature 263 may be provided by discovering nearby WiFi hotspots and using their location property (which may be retrieved from an online WiFi database) to determine a location of the device 201. Other location sensing features 263 are also possible.

The mapping application may use the location sensing feature 263 to determine a current location of the device 201 and, in some embodiments, to display a map of the current location of the device 201 based on the map data. The mapping application may use the location sensing feature 263 to provide navigation functions (such as route determination and/or turn-by-turn directions) which navigate to a destination from the current location of the device 201.

The mapping application 226 includes an application programming interface 228 (API) which is configured to allow other applications 224 to access features of the mapping application 226. The API 228 allows third party developers to integrate features provided by the mapping application 226 into other applications 223.

The API 228 is, in at least some embodiments, configured to receive instructions from other applications 223 to allow those other applications 223 to cause a map defined by the map data 225 to be displayed on the display. The API 228 is, in at least some embodiments, configured to receive instructions for managing geospatial data. Such instructions may, among other things, add or remove geospatial data to one or more containers, tag or untag geospatial data, and/or execute one or more functions on all geospatial data having a specified tag. Features of the API 228 are discussed in greater detail below with reference to FIGS. 3 to 7.

By way of example, the other applications 223 which may access some of the features of the mapping application 226 through the API 228 may include a range of applications, including, for example, third party navigation applications, Internet browser applications, address book applications, messaging applications, calendar applications, and/or notepad applications. In some embodiments, the other applications 223 include an email message application, a push content viewing application, a voice communication (i.e. telephony) application, and a media player application. Each of the other applications 223 may include layout information defining the placement of particular fields and graphic elements (e.g. text fields, input fields, icons, etc.) in the user interface (i.e. the display device 204). It will be appreciated that other application apart from those specifically listed above may access functions of the mapping application 226 through the API 228.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network. The auxiliary I/O subsystems 250 may comprise a vibrator for providing vibratory notifications in response to various events on the mobile device 201 such as receipt of a wireless communication or incoming phone call, or for other purposes such as haptic feedback (touch feedback).

The mobile device 201 also includes a storage memory 230. The storage memory may, in various embodiments, be comprised of a removable memory card (typically comprising flash memory), such as, for example, a Secure Digital (SD), mini Secure Digital (miniSD), micro Secure Digital (microSD), or CompactFlash™ card. In some embodiments, the storage memory 230 may be comprised of an internal (non-removable) memory which is designated by the operating system as storage memory. For example, the storage memory 230 may be e-MMC™ memory. The storage memory 230 is inserted in or connected to a storage memory interface 232 of the mobile device 201.

The serial data port 252 may be used for synchronization with a user's host computer system 117 (FIG. 1). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

The mobile device 201 also includes a battery 238 as a power source, which is typically one or more rechargeable batteries that may be charged, for example, through charging circuitry coupled to a battery interface 236, such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 272 is an additional optional component which provides for communication between the mobile device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the mobile device 201 during or after manufacture. Additional applications and/or upgrades to the operating system 221 or software applications 224 may also be loaded onto the mobile device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the flash memory 244, or written into and executed from the RAM 246 for execution by the processor 240 at runtime.

The mobile device 201 may, in some embodiments, provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 204. A user of the mobile device 201 may also compose data items, such as email messages, for example, using the touch-sensitive overlay 206 in conjunction with the display device 204 and possibly other input mechanisms 260 and/or the auxiliary I/O subsystems 250. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile wireless device 201. Although voice or audio signal output is typically accomplished primarily through the speaker 256, the display device 204 may also be used to provide an indication of the identity of a calling party, duration of a voice call, or other voice call related information.

Map Screen

Figure 3:
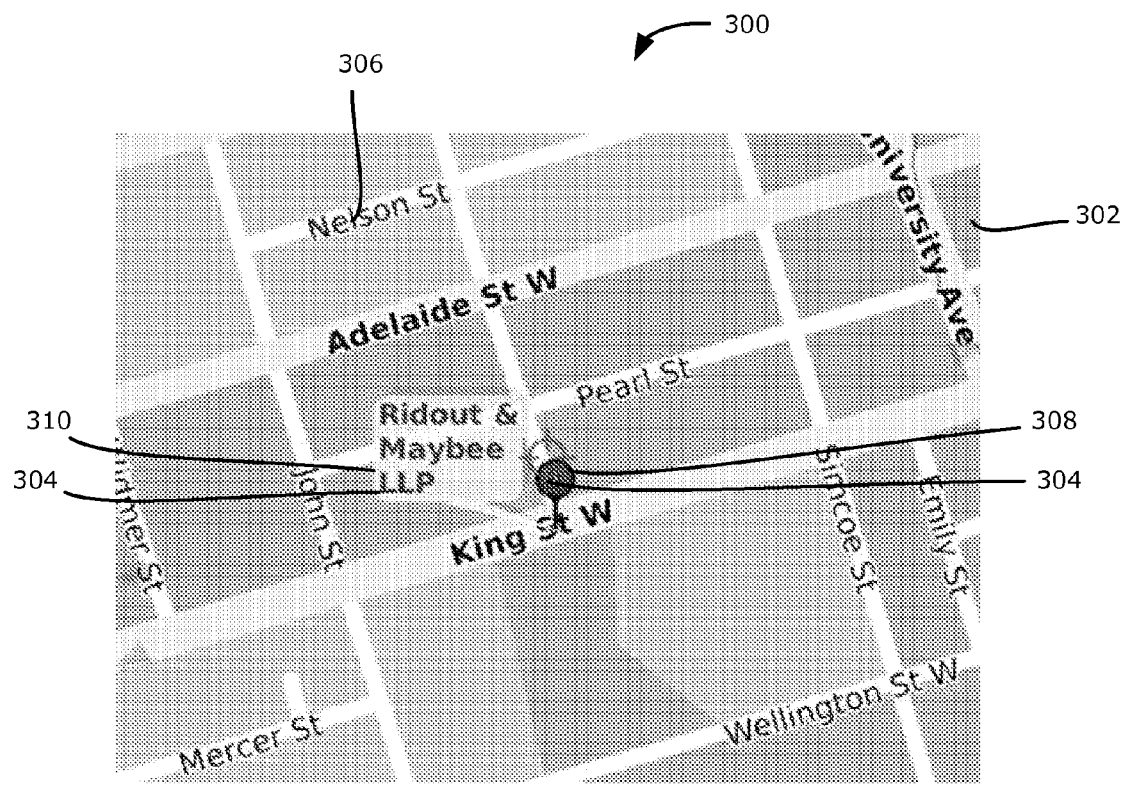
FIG. 3 is an example map screen in accordance with example embodiments of the present disclosure.

Referring now to FIG. 3, an example map screen 300 is illustrated. The example map screen 300 may be displayed in the display 204 (FIG. 2) of the mobile device 201 (FIG. 2). The example map screen 300 may, in some embodiments, occupy all of the screen area of the display 204. In other embodiments, the map screen 300 may be displayed within another window or screen, such as, for example, a window or screen that is provided by a software application 224 which interacts with and accesses features of the mapping application 226 through the API 228.

The map screen 300 includes a map 302 which is defined by map data 225 (FIG. 2). The map data 225 required to display the map 302 may be retrieved from local memory of the device 201 (as shown in the embodiment of FIG. 2) or from a remote map server 138 (as shown in the embodiment of FIG. 1). The map data 225 may, in some embodiments, include one or more labels 306 (an example of which is labelled "Nelson St") which identify street names, or other geographic locators. The labels 306 which may be included in the map data 225 and/or displayed on the map may depend on a zoom level associated with the map. For example, zooming in on a map may, in at least some embodiments, cause additional street names or other geographic locators to be displayed on the display 204.

The map screen 300 also includes one or more geospatial data identifiers 304, which, in the embodiment shown, is comprised of a pushpin 308 and identification text 310 (which, in the embodiment shown, is labelled "Ridout & Maybee LLP"). The geospatial data identifiers 304 are displayed at a location determined by the geospatial data 227. More particularly, the geospatial data identifiers 304 are displayed at locations specified by the coordinating data of the geospatial data 227 (FIG. 2). That is, coordinating data of the geospatial data 227 is used to display the geospatial data identifiers 304 on the map 302 at a location on the map which corresponds to the coordinating data.

The specific nature of the geospatial data identifiers 304 may depend, at least in part, on the nature of the geospatial data 227. For example, geospatial data 227 which represents an area, such as a polygon, circle, or other shape, may be associated with geospatial data identifiers 304 which are comprised of a shaded or filled overlay corresponding to that shape. Similarly, geospatial data 227 which represents a line or a series of lines may be associated with geospatial data identifiers 304 which cause a corresponding line to be drawn on the map in a predetermined color. That is, a line may be drawn on the map based on the geospatial data 227 defining that line. More particularly, the line may be drawn on the map in a position on the map which is determined by the coordinating data of the geospatial data 227. The predetermined color of the line may be selected to avoid colors which are used for other purposes on the map.

Storage of Geospatial Data in Memory Container

A container is a class, data structure or abstract data type whose instances are collections of other objects. The container may, for example, be a list, a set, an array, or a tree. The container stores data in a memory.

Containers may be used, in at least some embodiments, to store geospatial data which may be used to overlay geospatial data identifiers 304 (FIG. 3) on a map 302 (FIG. 3).

As will be explained in greater detail below, in at least some embodiments, a mapping application 226 (FIG. 2) may access a plurality of containers in order to retrieve geospatial data 227 (FIG. 2) stored in each of the containers in order to cause an overlay based on the geospatial data 227 (FIG. 2) of the plurality of containers to be displayed on top of a map 302 (FIG. 3).

Figure 4:
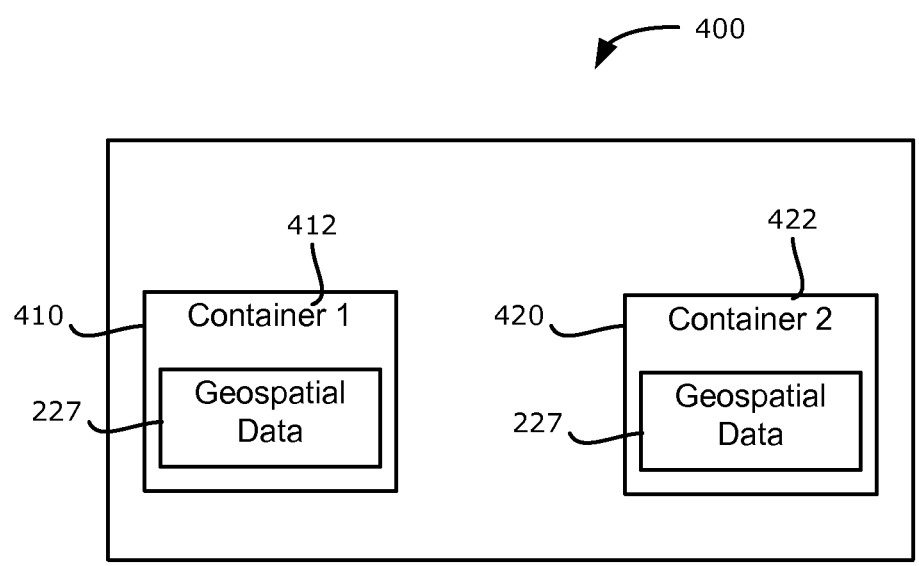
FIG. 4 is a block diagram of a memory data structure in accordance with example embodiments of the present disclosure.

Referring now to FIG. 4, a block diagram of an example memory data structure 400 is illustrated. The memory data structure 400 is a data structure which is stored in memory of the mobile device 201 (FIG. 2), such as, for example, the flash memory 244 (FIG. 2) of the mobile device 201.

The memory data structure 400 includes a plurality of containers 410, 420. In the example illustrated, the memory data structure 400 includes two containers which include a first container 410 and a second container 420. While two containers are illustrated in FIG. 4, it will be appreciated that in some embodiments more than two containers may be included. It will also be appreciated that, in some embodiments, only a single container will be used.

Each container is associated with a container identifier 412, 422. The first container 410 is associated with a first container identifier 412, which, in the embodiment illustrated is "Container 1". Similarly, the second container 420 is associated with a second container identifier 422, which, in the embodiment illustrated, is "Container 2."

The container identifier 412, 422 identifies the containers 410, 420. The container identifier 412, 422 may be used to store data in a specific container and to retrieve data from a specific container. That is, the container identifier 412, 422 may be used to specify the specific container which a command to store data or a command to retrieve data relates to. As will be discussed in greater detail with reference to FIG. 5, the container identifier 412, 422 may be used when adding data to one of the containers in order to ensure that the data is added to the correct container. Similarly, the container identifier 412, 422 may also be used when removing data from one of the containers in order to ensure that the data is removed from the correct container.

The containers may each store geospatial data 227. As noted above, geospatial data 227 is information which is related to a geographic location. For example, geospatial data may pertain to characteristics of natural or constructed features and boundaries on the earth's surface. Geospatial data includes coordinating data, such as latitude and longitude values which may be used to determine the location of the geospatial data on the map.

Geospatial data 227 may, for example, include coordinating data to identify a point of interest on a map, such as a location of a person, place or thing, a route, or a geographic area. Where the geospatial data 227 identifies a point, the geospatial data 227 may be defined by coordinates, such as latitude and longitude coordinates. Where the geospatial data 227 identifies an area, the geospatial data may be defined by a polygon, a circle, an ellipse, or another shape. Similarly, where the geospatial data 227 identifies a route or line, the geospatial data may, for example, be defined as a vector, or as a series of points. It will be appreciated that other methods of defining geospatial data 227 are also possible.

The geospatial data 227 may include other information associated with the coordinating data, such as, for example, identifying information such as a name associated with a business, place or thing defined by the coordinating data.

As will be explained in greater detail below with reference to FIG. 5, the mapping application 226 may be configured to render a map 302 (FIG. 3) based on map data 225 (FIG. 2) on the display 204 (FIG. 2) of the device 201. The mapping application 226 (FIG. 2) may also be configured to render geospatial data identifiers 304 (FIG. 3) related to the geospatial data 227 (FIG. 4) stored in one or more of the containers 410, 420 (FIG. 4) as an overlay on the map 302 (FIG. 3).

The mapping application 226 may be configured to receive instructions through an API 228 to, among other things, provide one or more of the following functions for use by other applications 223 (FIG. 2): functions to add geospatial data 227 to one or more containers; functions to remove geospatial data 227 from one or more container; and/or functions to display a map 302 having overlaid thereon geospatial data identifiers corresponding to the geospatial data 227.

Figure 5:
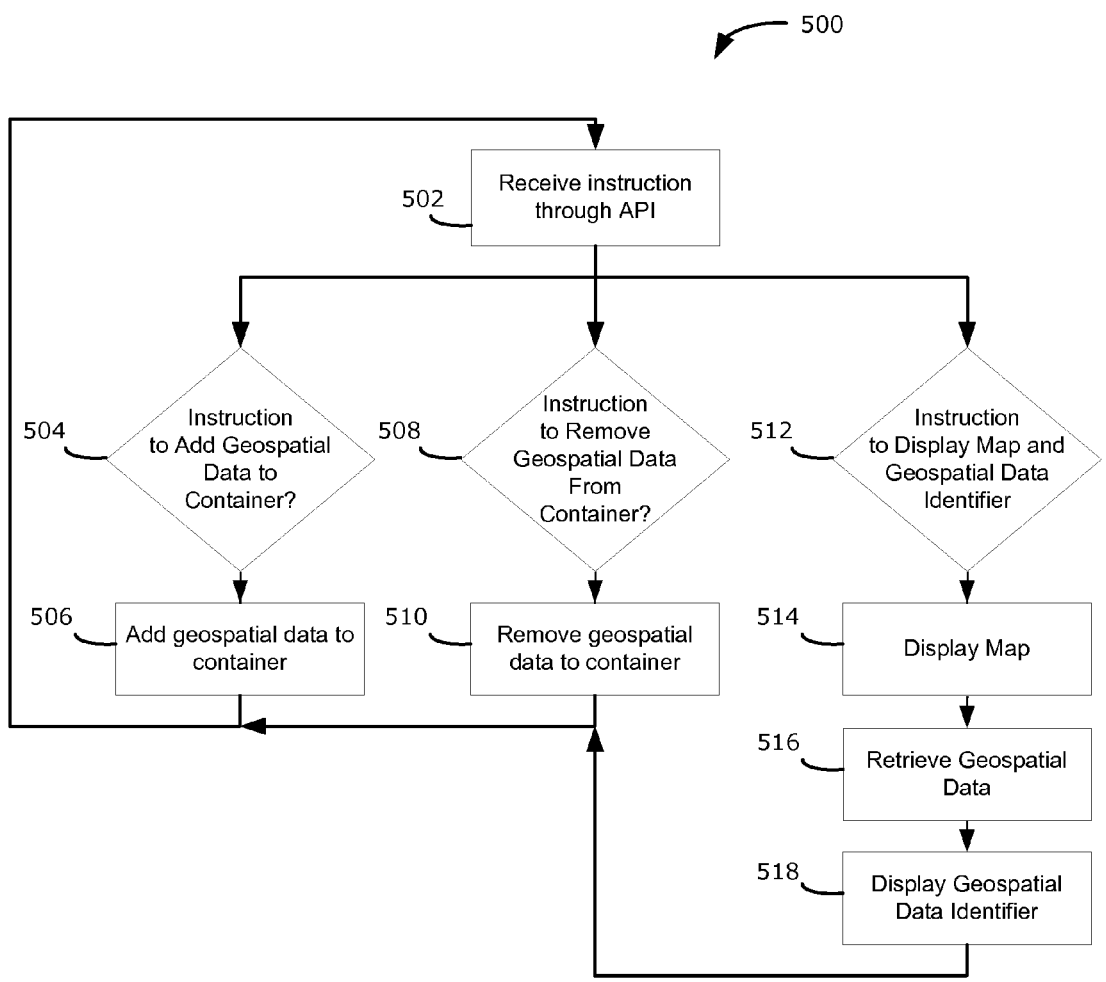
FIG. 5 is a flowchart illustrating processes for adding geospatial data to a container, removing geospatial data from a container, and displaying a map having an overlay in accordance with example embodiments of the present disclosure.

Referring now to FIG. 5, a process 500 for adding geospatial data 227 (FIG. 4) to a container 410, 420 (FIG. 4), removing geospatial data from a container, and displaying a map having an overlay comprising one or more geospatial data identifiers 304 (FIG. 3) is illustrated.

The mobile device 201 (FIG. 2) may be configured to perform the process 500 of FIG. 5. More particularly, the API 228 may be configured to cause one or more controllers of the device 201 (FIG. 2), such as the processor 240 (FIG. 2), to execute the steps of the process 500 of FIG. 5. In the following discussion of the process 500 of FIG. 5, all reference numerals which relate to device or system components (as opposed to steps of a process or method), such as processor 240, refer to components such as those illustrated, by example, in FIGS. 1 to 4.

At 502, an instruction is received through the API 228 from another application 223 (i.e. an application other than the mapping application 226) associated with the device 201.

The API 228 may be equipped to receive a plurality of instructions from the other applications 223 which allow the other applications 223 to access features provided by the mapping application 226. For example, the API 228 may permit the other applications 223 to add geospatial data to one or more container, to remove geospatial data 227 from one or more container 410, 420, and/or cause a map and geospatial data identifiers 304 to be displayed on a display 204 of the device 201.

The instruction received at 502 may be an instruction to add geospatial data to a container. In such cases, the geospatial data 227 associated with the instruction is provided to the API 228 by the other application 223. The geospatial data provided to the API 228 may include, for example, coordinating data, such as a latitude and longitude value associated with the geospatial data. The geospatial data may also include unique identification information, such as a name of a business, place, or thing located at the location specified by the latitude and longitude value.

If the instruction received at 502 is an instruction to add geospatial data to a container (as determined at 504), then at 506, the geospatial data associated with the instruction is added to the container.

As noted above in the discussion of FIG. 4, in some embodiments, the mapping application 226 may allow for the use of more than one container for storing geospatial data. In such embodiments, the instruction received at 502 may include a container identifier 412 (FIG. 4) which identifies the specific container to which the geospatial data will be added. In such embodiments, at 506, the geospatial data is added to the container specified in the instruction received at 502. For example, in some embodiments, an instruction to add geospatial data to a first container may be received. In response to receiving such an instruction, the geospatial data may be stored in the first container. Similarly, an instruction to add geospatial data to a second container may also be received. In response to receiving such an instruction, the geospatial data may be stored in the second container.

The instruction received at 502 may be an instruction to remove geospatial data from a container. In such cases, information which permits the API 228 to determine which geospatial data is to be removed from the container may be provided to the API 228 from the other application 223. For example, the other application 223 may provide unique identification information (such as a name of a business, place, or thing) which allows the API 228 to identify the desired geospatial data.

If the instruction received at 502 is an instruction to remove geospatial data from a container (as determined at 508), then at 510, the geospatial data is removed from the container.

As noted above, in some embodiments, the mapping application 226 may allow for the use of more than one container for storing geospatial data. In such embodiments, the instruction received at 502 may include a container identifier 412 (FIG. 4) which identifies the specific container from which the geospatial data will be removed. In such embodiments, at 510, the geospatial data is removed from the container specified in the instruction received at 502. For example, in some embodiments, an instruction to remove geospatial data from a first container may be received. In response to receiving such an instruction, the geospatial data may be removed from the first container. Similarly, an instruction to remove geospatial data from a second container may also be received. In response to receiving such an instruction, the geospatial data may be removed from the second container.

The instruction received at 502 may be an instruction to display a map on the display 204 (FIG. 2). The instruction may specify the area of the map which is to be displayed. The area may be specified in terms of a center point and zoom level of the map. For example, the instruction may specify the center point in terms of latitude and longitude values. The zoom level may be specified in terms of a zoom multiplier value which describes the zoom level relative to a standard zoom level. In other embodiments, the area of the map to be displayed may be specified using latitude and longitude values of opposing corners of a rectangular map area. Other methods of defining the area of the map to be displayed are also possible.

If the instruction received at 502 is an instruction to display a map on the display (as determined at 512), then at 514, the map is displayed on the display 204 as a map screen 300, such as the map screen 300 of FIG. 3. The map screen 300 may be displayed within another window or screen, such as, for example, a window or screen that is provided by a software application 224 which interacts with the mapping application 226 through the API 228.

The instruction received at 502 may also include an instruction to display one or more geospatial data identifiers 304 on the map 302. The instruction to display one or more geospatial data identifiers 304 on the map 302 may be an instruction which is separate from the instruction to display a map on the display. That is, at 502, in some embodiments, two separate instructions may be received. The first is an instruction to display the map and the second is an instruction to display at least one geospatial data identifier. Alternatively, in other embodiments, a single instruction may be received at 502. For example, in some embodiments, an instruction to display a map may be interpreted as an instruction to display a map and also an instruction to overlay, on the map, geospatial data identifiers associated with geospatial data in one or more containers.

If the instruction received at 502 is interpreted by the API 228 as an instruction to display one or more geospatial data identifier on the map, then at 516, geospatial data is retrieved from one or more containers 410, 420 in memory of the device 201.

As noted above, in some embodiments, the mapping application 226 may allow for the use of more than one container for storing geospatial data. In such embodiments, the instruction received at 502 may include a container identifier 412 (FIG. 4) which identifies the specific container from which the geospatial data will be retrieved. In such embodiments, at 502, the geospatial data is retrieved from the container specified in the instruction received at 502. For example, in some embodiments, an instruction to display one or more geospatial data identifier based on geospatial data from a first container may be received. In response to receiving such an instruction, the geospatial data may be retrieved from the first container (at 516). Similarly, an instruction to display one or more geospatial data identifier based on geospatial data from a second container may be received. In response to receiving such an instruction, the geospatial data may be retrieved from the first container (at 516).

The instruction received at 502 may specify more than one container from which geospatial data is to be retrieved. In such embodiments, at 516, geospatial data may be retrieved from more than one container. For example, the instruction to display geospatial data identifiers may specify a first container and a second container. In such embodiments, geospatial data may be retrieved from both the first container and the second container at 516.

In at least some embodiments, the instruction to display geospatial data identifiers may not specify a container. Instead, at 516, geospatial data may be retrieved from all available containers. In other embodiments, at 516, geospatial data may be retrieved from one or more predetermined geospatial containers.

At 518, one or more geospatial data identifiers 304 (FIG. 3) are displayed as an overlay on top of the map in accordance with the geospatial data retrieved from the one or more containers. For example, where geospatial data was retrieved from a first container and a second container at 516, one or more geospatial data identifiers 304 are displayed as an overlay on the map in accordance with the geospatial data in the first container and the geospatial data in the second container.

The geospatial data identifiers 304 may, in various embodiments, include any one or combination of the following: identification text 310 (an example of which is illustrated in FIG. 3), a pushpin 308 (an example of which is illustrated in FIG. 3), an area marker, such as a shaded or filled shape, a line of a predetermined color. Other geospatial data identifiers 304 are also possible.

As noted above, in some embodiments, the mapping application 226 may allow for the use of more than one container 410, 420 for storing geospatial data. In at least some such embodiments, the geospatial data identifiers which are displayed at 518 may be displayed irrespective of the container in which the geospatial data associated with the geospatial data identifier was located. That is, when displaying geospatial data identifiers at 518, the API 228 may not consider the location at which the geospatial data associated with the identifiers was stored. However, in other embodiments, the geospatial data identifiers which are displayed at 518 may be displayed with rendering options which are associated with each container. For example, geospatial data identifiers for geospatial data in a first container may be displayed in a first color and geospatial data identifiers for geospatial data in a second container may be displayed in a second color.

It will be appreciated that, while FIG. 5 illustrates an API which is configured for at least three functions (adding data to a container, removing data from a container and displaying a map screen), other embodiments may provide an API which includes only a subset of the functions of FIG. 5. For example, in some embodiments, an API may allow other applications 223 to add geospatial data to a container, but not remove geospatial data from a container. It will also be appreciated that the API 228 may include functions in addition to the functions described in FIG. 5. For example, the API may also include features described below with reference to FIG. 6.

Tagging and Untagging Geospatial Data

Figure 6:
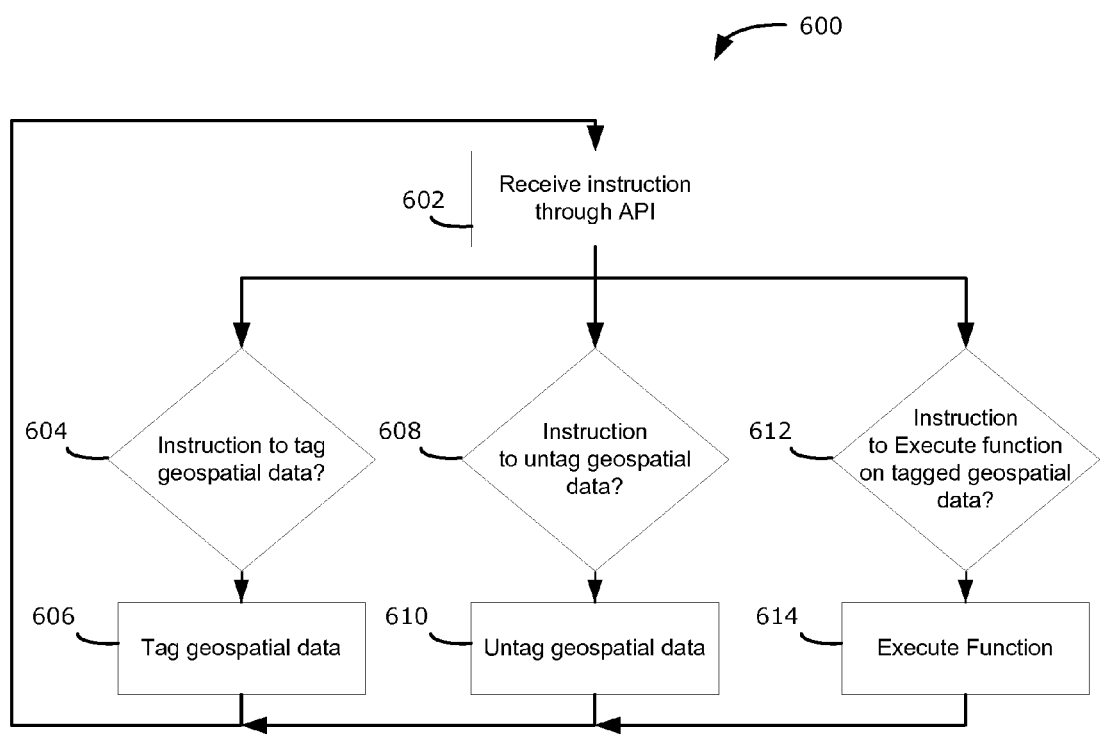
FIG. 6 is a flowchart illustrating processes for managing geospatial data through the use of one or more tags in accordance with example embodiments of the present disclosure.

Referring now to FIG. 6, further features which are, in some embodiments, included in the API 228 are described. FIG. 6 illustrates a flowchart of a process 600 for managing geospatial data through the use of one or more tags.

The mobile device 201 may be configured to perform the process 600 of FIG. 6. More particularly, the API 228 may be configured to cause one or more controller of the device 201 (FIG. 2), such as the processor 240 (FIG. 2), to execute the steps of the process 600 of FIG. 6. In the following discussion of the process 600 of FIG. 6, all reference numerals which relate to device or system components (as opposed to steps of a process or method), such as processor 240, refer to components such as those illustrated by way of example in FIGS. 1 to 4.

At 602, an instruction is received through the API 228 from another application 223 (i.e. an application other than the mapping application 226) associated with the device 201.

As noted above in the discussion of FIG. 5, the API 228 may be equipped to receive a plurality of instructions from the other applications 223 which allow the other applications 223 to access features provided by the mapping application 226. For example, the API 228 may permit the other applications 223 to associate geospatial data with one or more tag, to remove the association between geospatial data and one or more tag, and/or cause a map and geospatial data identifiers to be displayed on a display 204 of the device 201.

If an instruction received at the API 228 from another application 223 is a tagging command (as determined at 604), then at 606, the geospatial data associated with the instruction received at 602 is tagged. A tagging command is an instruction to tag geospatial data. Tagging is a process of associating geospatial data with one or more tags or labels. The tags or labels are used to indicate that the geospatial data belongs to a specific group of geospatial data. The tag may be a text-based label. A plurality of geospatial data may be associated with the same tag to indicate that the geospatial data belong to a common group. By way of example, a "grocery store" tag may be used to indicate geospatial data associated with grocery stores. By way of further example, a "home" tag may be used to indicate geospatial data associated with a user's home. A "work" tag may be used to indicate geospatial data associated with a user's work. A "restaurant" tag may be used to indicate geospatial data associated with a restaurant.

Specific geographic data may be associated with more than one tag. For example, a restaurant which is also a user's work may be associated with both a "restaurant" tag and a "work" tag.

The tagging command received at 602 may specify geospatial data and a tag which will be applied to the specified geospatial data. In response to receiving a tagging command at 606, the API 228 may cause memory of the device 201 to be updated to store the association between the specified geospatial data and the specified tag. That is, in response to receiving a tagging command, the API 228 may cause the specified geospatial data to be tagged with the specified tag.

The association between the specified geospatial data and the specified tag may be created in a container 410, 420 (FIG. 4). That is, the contents of at least one container may be updated to store the specified geospatial data, the specified tag, and an indication that the specified geospatial data is associated with the specified tag.

It will be appreciated that the containers of FIG. 4 differ from the tags described with respect to FIG. 6 in one or more of the following aspects. A container refers to a memory construct. That is, the container refers to a class, data structure or abstract data type whose instances are collections of other objects. The container may, for example, be a list, a set, an array, or a tree. That is, the container relates to the location at which the data is stored. In contrast, the tag relates to a group to which the data belongs. Generally, each instance of geospatial data is stored in only one container. However, geospatial data may have more than one tag. Since tags relate to the nature of geospatial data (as opposed to where the geospatial is stored), tags may be stored with geospatial data in containers.

By way of example, in at least some embodiments, the following example commands may be used to instruct the API to define three locations, and then tag the locations using the tags "RIM" or "justinHome".

```
MapDataModel model = map.getModel( );
MapLocation office01 = new MapLocation( 43.47550, −80.53900, "Head Office", null );
MapLocation office02 = new MapLocation( 43.48261, −80.54169, "Manufacturing", null );
MapLocation justinHome = new MapLocation( 43.47751, −80.54817, "Justin -Home", null);
model.add( (Mappable) office01, "RIM");
model.add( (Mappable) office02, "RIM");
model.add( (Mappable) justinHome, "home");
```

It will be appreciated that the specific commands or syntax which may be used may vary from that described above.

If an instruction received at 602 is an untagging command to untag geospatial data (as determined at 608), then at 610 the association between the geospatial data and the tag is removed from the memory of the device 201. It will be appreciated that untagging geospatial data does not, in at least some embodiments, cause the geospatial data to be removed from memory. Rather, the untagging simply removes the association between the geospatial data and the tag. That is, the step 610 of untagging may, in at least some embodiments, be contrasted with the step 510 of removing geospatial data illustrated in FIG. 5.

The untagging command received at 602 specifies identification information which permits the API to determine the geospatial data and/or the tag related to the untagging command. The identification information may, in various embodiments, specify a specific tag, specific geospatial data, or both a specific tag and specific geospatial data. Where the identification information specifies a specific tag, but not specific geospatial data, any association between any geospatial data and the specified tag may be removed from memory. Where the identification information specifies geospatial data but not a tag, any association between the specified geospatial data and any tags may be removed from memory. Where the identification information specifies geospatial data and one or more tags, the association between the specified tag and the specified geospatial data may be removed from memory.

If an instruction received at 602 is a function command (which is determined at 612), then at 614, a function associated with the command is executed. In at least some embodiments, the function command received at 602 references a tag associated with one or more geospatial data. For example, the function command may reference the tag which is associated with the geospatial data at 606. In such embodiments, at 614, the function associated with the function command may be executed for all geospatial data associated with the tag referenced by the function command. That is, by specifying a tag with the function command, a function may be applied to all geospatial data which has been associated with that tag.

In at least some embodiments, the function associated with the function command is an option to set one or more rendering options associated with geospatial data to a setting which is specified by the function command. The rendering option may, in at least some embodiments, specify a format of a geospatial data identifier. The rendering option may, in some embodiments, specify a font to use when displaying geospatial data identifiers associated with the geospatial data. For example, the rendering option may specify a font to use when displaying identification text 310 (FIG. 3) associated with the geospatial data. The rendering option may, in some embodiments, specify a type of geospatial data identifier to be used in association with the tagged geospatial data. For example, the rendering option may indicate that a pushpin geospatial data identifier is to be rendered as an overlay on the display 204 in a location determined by the geospatial data.

The rendering option may, in some embodiments, specify a color associated with a geospatial data identifier which is to be used in association with the tagged geospatial data. For example, the rendering option may specify that a green pushpin should be displayed as an overlay on the map at a location determined by the geospatial data.

Accordingly, where the function command specifies a rendering option, when the map is rendered, an overlay may also be displayed which displays at least one geospatial data identifier in accordance with the rendering option. The geospatial data identifier may be displayed at a location which is determined according to the geospatial data. For example, where the rendering option is a pushpin, when the map is rendered, a pushpin may be rendered on the map in accordance with the geospatial data.

Set Visibility Control

Figure 7:
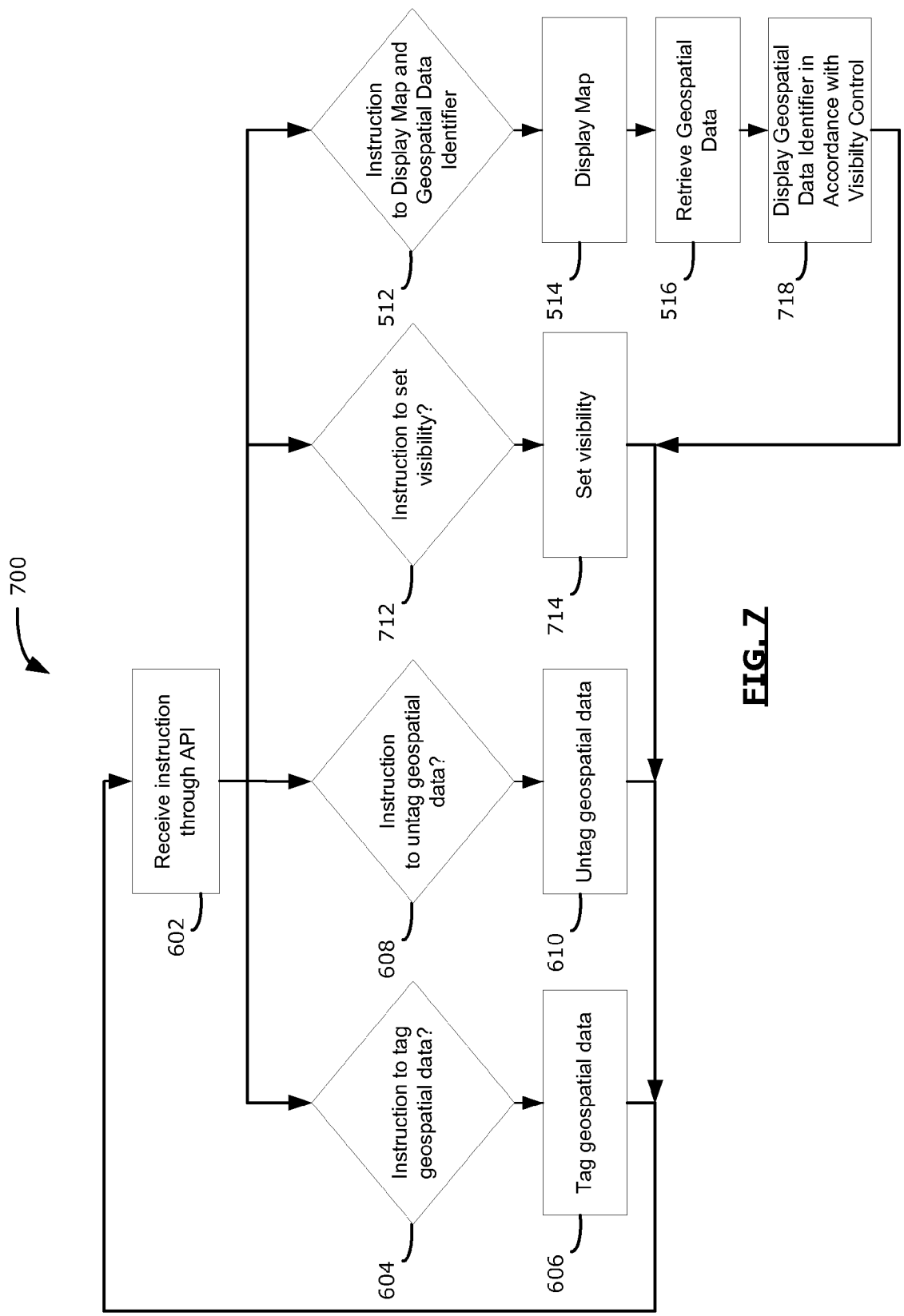
FIG. 7 is a flowchart illustrating a process of rendering an overlay on a map in accordance with example embodiments of the present disclosure.

In some embodiments, an example of which is illustrated in FIG. 7, the function command may be a command to set a visibility control associated with geospatial data. The visibility control indicates whether a geospatial data identifier associated with the geospatial data will be displayed (i.e. whether it will be visible) on an overlay on a map, when the geospatial data is located within a view provided by a map rendered on the display. The visibility control may be set to visible or not-visible.

In at least some embodiments, the visibility control of geospatial data is, by default, set to visible. That is, when geospatial data is added to a container, it is initially associated with a visibility control of visible. The default visibility control may, however, be overridden by if a function command is received from another application 223 to indicate that the visibility control is to be set to not-visible.

By way of example, in at least some embodiments, the following example command may be used to instruct the API to set geospatial data with a tag of "RIM" as visible:

model.setVisible("RIM");

It will be appreciated that the specific commands or syntax which may be used may vary.

Referring now to FIG. 7, a process 700 of rendering an overlay on a map in accordance with geospatial data is illustrated. The mobile device 201 may be configured to perform the process 700 of FIG. 7. More particularly, the API 228 may be configured to cause one or more controller of the device 201 (FIG. 2), such as the processor 240 (FIG. 2), to execute the steps of the process 700 of FIG. 7. In the following discussion of the process 700 of FIG. 7, all reference numerals which relate to device or system components (as opposed to steps of a process or method), such as processor 240, refer to components such as those illustrated by way of example in FIGS. 1 to 4.

As described above with reference to FIG. 6, the process 700 may include a step 602 in which an instruction is received through the API 228 from another application 223 (i.e. an application other than the mapping application 226) associated with the device 201.

As discussed above with reference to FIG. 6, the instruction may, in some embodiments be an instruction to tag geospatial data (as determined at step 604). If the instruction is an instruction to tag geospatial data, then, at step 606, the geospatial data is tagged in the manner discussed above with reference to FIG. 6.

If the instruction is an instruction to untag geospatial data (as determined at step 608), then at step 610, the geospatial data is untagged in the manner described above with reference to FIG. 6.

In some embodiments, the instruction received at step 602 may be an instruction to set a visibility control to a specified value. The instruction references a tag associated with geospatial data. If, at 712, the API 228 determines that the instruction is a command to set a visibility control then, at 714, the API 228 sets the visibility control for all geospatial data associated with the tag specified in the instruction to a value specified in the instruction. The value may be either visible or not-visible.

If the instruction received at 602 is an instruction to display a map on the display (as determined at 512), then at 514, the map is displayed on the display 204 as a map screen 300, such as the map screen 300 of FIG. 3. The steps 512 and 514 are discussed in greater detail above with reference to FIG. 5. The map screen 300 may be displayed within another window or screen, such as, for example, a window or screen that is provided by a software application 224 which interacts with the mapping application 226 through the API 228.

The instruction received at 602 may also include an instruction to display one or more geospatial data identifiers 304 on the map. The instruction to display one or more geospatial data identifiers on the map may be an instruction which is separate from the instruction to display a map on the display. That is, at 602, in some embodiments, two separate instructions may be received. The first is an instruction to display the map and the second is an instruction to display at least one geospatial data identifier. Alternatively, in other embodiments, a single instruction may be received at 602. For example, in some embodiments, an instruction to display a map may be interpreted as an instruction to display a map and also an instruction to overlay, on the map, geospatial data identifiers associated with geospatial data in one or more containers.

If the instruction received at 602 is interpreted by the API as an instruction to display one or more geospatial data identifiers 304 on the map, then at 516, geospatial data is retrieved from one or more containers in memory of the device 201, in the manner described above with reference to FIG. 6.

At 718, one or more geospatial data identifiers 304 (FIG. 3) are displayed as an overlay on top of the map in accordance with the geospatial data retrieved from the one or more containers and in accordance with the visibility control.

That is, the geospatial data identifiers are rendered as an overlay on the map for geospatial data with a visibility control which is set to visible. Geospatial data identifiers for geospatial data with a visibility control which is set to not-visible are excluded from being rendered on the display. That is, the overlay does not display a geospatial data identifier for geospatial data with a visibility control which is set to not-visible.

It will be appreciated that the use of containers and visibility settings permits data to remain in a container and to be managed by a mapping application even if the geospatial data is not presently displayed on the display.

In accordance with further example embodiments of the present disclosure, a development tool is provided for developing applications which interact with the API 228. The development tool provides assistance to developers, in the form of prompts on a display associated with a computer used by a developer, to develop applications which interact with the API 228. The development tool may, among other things, provide a list of functions provided by the API 228 and a description of the syntax of requests to the API 228 and a description of the meaning of values returned from the API 228.

In accordance with a further example embodiment of the present disclosure, there is provided an application which is configured to interact with the API 228. The application is configured to send requests to the API 228, in the manner described above with reference to FIGS. 1 to 4 and to receive feature information from the API 228.

In accordance with further embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a mobile wireless device for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a prerecorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

FIGS. 5-7 are flowcharts of example embodiment methods. Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps.

The invention claimed is:

1. A method comprising:
    receiving, at an application programming interface associated with a mapping application on a device, one or more tagging commands from at least one application on the device to associate specified geospatial data with a specified tag, wherein the tag is associated with at least two locations identified by separate geospatial data, wherein the geospatial data is associated with one separate text, wherein the geospatial data identifies a location by coordinates and wherein the tag is a text-based label that identifies the nature of the location and wherein the tag does not identify the location by coordinates;
    in response to receiving each tagging command, updating a memory of the device to store an association between the specified geospatial data and the specified tag;
    receiving, at the application programming interface, a function command from the at least one application on the device, wherein the function command references one of the specified tags and wherein the function command is a command to set at least one rendering option associated with the separate text that is associated with the geospatial data associated with the specified tag to a setting specified by the function command, the rendering option and the setting describing at least one of a font, a size, or a color;
    in response to receiving the function command, executing a function associated with the function command on the separate text associated with all geospatial data associated with the tag referenced by the function command, and wherein the tag referenced by the function command is associated with the at least two locations identified by separate geospatial data, wherein the application programming interface provides an interface for the at least one application on the device to access features of the mapping application, wherein the function command configures the setting for the separate text associated with the geospatial data associated with the tag referenced by the function command;
    rendering a map on a display on the device; and
    rendering, on an overlay on the map, the separate text associated with the geospatial data configured based on the setting.

2. The method of claim 1, wherein the function command includes a command to set a visibility control associated with the geospatial data, the visibility control indicating whether a geospatial data identifier associated with the geospatial data will be visible on the map.

3. The method of claim 2, wherein the overlay displays geospatial data identifiers for geospatial data with a visibility control which is set to visible and excludes geospatial data identifiers for geospatial data with a visibility control which is set to not-visible.

4. The method of claim 1, wherein the overlay displays at least one geospatial data identifier in accordance with the rendering option.

5. The method of claim 1, wherein the setting specified indicates that the geospatial data is to be rendered with a pushpin to indicate the location of the geospatial data relative to a map, the method further comprising: rendering a map on the display of the device; and rendering one or more pushpin on the map in accordance with the geospatial data.

6. The method of claim 1, further comprising:
    receiving, at the application programming interface, an instruction to add geospatial data to a first container;
    in response to receiving the instruction to add geospatial data to the first container, storing the geospatial data in the first container;
    receiving, at the application programming interface, an instruction to add geospatial data to a second container;
    in response to receiving the instruction to add geospatial data to the second container, storing the geospatial data in the second container, wherein rending the map on a display on the device is in response to receiving a command to display a map, and wherein the overlay on the map is rendered in accordance with the geospatial data in the first container and the geospatial data in the second container.

7. The method of claim 6, wherein the first container is a data structure or class which stores data in the memory.

8. A mobile device comprising:
    at least one processor;
    at least one memory storing a mapping application having an application programming interface, the application programming interface being configured to cause the processor to:
        receive, at an application programming interface associated with a mapping application on a device, one or more tagging commands from at least one application on the device to associate specified geospatial data with a specified tag, wherein the tag is associated with at least two locations identified by separate geospatial data, wherein the geospatial data is associated with one separate text, wherein the geospatial data identifies a location by coordinates and wherein the tag is a text-based label that identifies the nature of the location and wherein the tag does not identify the location by coordinates;

in response to receiving each tagging command, update a memory of the device to store an association between the specified geospatial data and the specified tag;

receive, at the application programming interface, a function command from the at least one application on the device, wherein the function command references one of the specified tags and wherein the function command is a command to set at least one rendering option associated with the separate text that is associated with the geospatial data associated with the specified tag to a setting specified by the function command, the rendering option and the setting describing at least one of a font, a size, or a color;

in response to receiving the function command, execute a function associated with the function command on the separate text associated with all geospatial data associated with the tag referenced by the function command, and wherein the tag referenced by the function command is associated with the at least two locations identified by separate geospatial data, wherein the application programming interface provides an interface for the at least one application on the device to access features of the mapping application, wherein the function command configures the setting for the separate text associated with the geospatial data associated with the tag referenced by the function command;

render a map on a display associated with the device; and render, on an overlay on the map, the separate text associated with the geospatial data configured based on the setting.

9. The mobile device of claim 8, wherein the function command includes a command to set a visibility control associated with the geospatial data, the visibility control indicating whether a geospatial data identifier associated with the geospatial data will be visible on the map.

10. The mobile device of claim 9, wherein the overlay displays geospatial data identifiers for geospatial data with a visibility control which is set to visible and excludes geospatial data identifiers for geospatial data with a visibility control which is set to not-visible.

11. The mobile device of claim 8 wherein the overlay displays at least one geospatial data identifier in accordance with the rendering option.

12. The mobile device of claim 8, wherein the setting specified rendering option indicates that the geospatial data is to be rendered with a pushpin to indicate the location of the geospatial data relative to the map, wherein the application programming interface is further configured to render one or more pushpin on the map in accordance with the geospatial data.

13. The mobile device of claim 8, wherein the application programming interface is further configured to:

receive, at the application programming interface, an instruction to add geospatial data to a first container;

in response to receiving the instruction to add geospatial data to the first container, store the geospatial data in the first container;

receive, at the application programming interface, an instruction to add geospatial data to a second container;

in response to receiving the instruction to add geospatial data to the second container, store the geospatial data in the second container, wherein rendering the map on a display on the device is in response to receiving a command to display a map, and wherein the overlay on the map is rendered in accordance with the geospatial data in the first container and the geospatial data in the second container.

14. The mobile device of claim 13, wherein the first container is a data structure or class which stores data in the memory.

15. The method of claim 1, further comprising:

receiving an instruction to untag specified geospatial data and, in response, updating a memory of the device to remove an association between the specified geospatial data and at least one tag.

16. The mobile device of claim 8, wherein the application programming interface is further configured to cause the processor to:

receive an instruction to untag specified geospatial data and, in response, update the memory of the device to remove an association between the specified geospatial data and at least one tag.

* * * * *